United States Patent [19]

Mennucci et al.

[11] Patent Number: 5,783,317
[45] Date of Patent: Jul. 21, 1998

[54] MULTILAYER METAL COMPOSITE FOR MICROWAVE TUBING AND THE LIKE

[75] Inventors: Joseph P. Mennucci, Manville; Robert P. Willis, Lincoln, both of R.I.; James F. Fasino, Mansfield, Mass.

[73] Assignee: Brush Wellman Inc., Cleveland, Ohio

[21] Appl. No.: 624,902

[22] Filed: Mar. 27, 1996

[51] Int. Cl.⁶ .................. B32B 15/01; B32B 15/20; H01P 3/00

[52] U.S. Cl. .................. 428/673; 428/674; 428/675; 333/239; 333/242

[58] Field of Search .................. 428/669, 674, 428/675, 586, 673, 929; 333/239, 242; 138/137, 138, 139; 200/266, 267, 268, 269

[56] References Cited

U.S. PATENT DOCUMENTS

| | | | |
|---|---|---|---|
| 2,608,753 | 9/1952 | Mooradian | 29/199 |
| 3,136,965 | 6/1964 | Lunden | 333/95 |
| 3,234,489 | 2/1966 | Hahne et al. | 333/95 |
| 3,535,094 | 10/1970 | Opie et al. | 29/191 |
| 4,521,257 | 6/1985 | Gevatter et al. | 148/11.5 Q |
| 5,139,890 | 8/1992 | Cowie et al. | 428/670 |
| 5,304,962 | 4/1994 | Bobadilla et al. | 333/134 |
| 5,363,464 | 11/1994 | Way et al. | 385/125 |
| 5,462,712 | 10/1995 | Langan et al. | 420/528 |
| 5,602,365 | 2/1997 | Bobadilla et al. | 174/71 |

Primary Examiner—Paul J. Thibodeau
Assistant Examiner—Holly C. Rickman
Attorney, Agent, or Firm—Hopgood, Calimafde Kalil & Jodlowe

[57] ABSTRACT

A multi-layer metal composite for microwave tubing and the like, which comprises a tubular shaped copper alloy base metal (e.g., brass or phosphorus bronze) lined with silver. A relatively thin interliner layer of a grain refiner containing copper alloy (e.g., copper-zirconium alloy (C15100), tellurium-copper (C14530), cadmium-copper (C14300), manganese-copper (C15500), alumina-copper (C157XX), beryllium-copper (C17410), or the like) is provided between the base metal and the silver, for limiting diffusion of impurities from the base metal into the silver coating and for maintaining a smooth, relatively constant cross section of silver.

10 Claims, 2 Drawing Sheets

MULTILAYER METAL COMPOSITE FOR MICROWAVE TUBING AND THE LIKE

FIELD OF THE INVENTION

The present invention relates generally to high conductivity materials and more particularly to a novel composite for constructing microwave tubing and the like.

BACKGROUND OF THE INVENTION

Microwave tubing is commonly manufactured by forming or winding flat, coated copper alloy strip into a tubular shape. To improve mechanical strength and ductility of the tube, a copper alloy base metal, e.g., brass (70Cu30Zn) or bronze (95Cu5Sn), is often used. In addition, a silver coating is typically provided on inside surfaces of the tube to enhance its electrical conductivity for microwave transmission.

Conventional techniques for coating base metals with silver include electroplating and cladding. While composites of silver clad brass and silver clad bronze have been found useful, their metallurgy often imposes limitations on tubing design.

In an attempt to overcome these limitations, i.e., to strengthen the tubing, alloying elements are often added to the base metal. Zinc, for example, has been added to strengthen copper in copper alloy base metals such as brass. Tin is often used to reinforce copper in bronze base metals. However, during heat treatment of the base metal (after it has been clad with silver), the strengthening agent (zinc or tin) often out-gases from the base metal and deposits on the surface of the silver coating. This agent also diffuses into the silver at the silver-base metal interface. The resulting deposited and diffused zinc (or tin) reduces substantially the electrical conductivity of the silver, thereby decreasing the efficiency of microwave transmission (measured as "return loss" and "insertion loss").

In developing a suitable composite, metallurgists have been faced with many trade-offs. For instance, to improve electrical conductivity, a relatively thick silver coating is desired, whereas a thinner silver coating typically provides higher strength and lowers cost. In addition, a large grain size in the base metal is generally desirable for improved formability, while a small grain size is sought to insure uniformity of thickness of the silver coating.

SUMMARY OF THE INVENTION

In accordance with one aspect of the present invention is a multilayer metal composite for microwave tubing and the like, which comprises a copper alloy base metal lined with silver and having a relatively thin interliner alloy layer between the base metal and the silver, for limiting diffusion of impurities from the base metal into the silver lining and for maintaining a smooth, relatively constant cross section of silver.

In accordance with another aspect of the present invention is a multilayer metal composite for microwave tubing and the like, which comprises a tubular shaped brass base metal lined with silver and having a relatively thin interliner layer of a grain refiner containing copper alloy between the base metal and the silver, for limiting diffusion of impurities from the base metal into the silver lining and for maintaining a smooth, relatively constant cross section of silver.

In accordance with a further aspect of the present invention is a multilayer metal composite for microwave tubing and the like, which comprises a tubular shaped phosphorus bronze base metal lined with silver and having a relatively thin interliner layer of a grain refiner containing copper alloy between the base metal and the silver, for limiting diffusion of impurities from the base metal into the silver lining and for maintaining a smooth, relatively constant cross section of silver.

Although the present invention is shown and described in connection with composites of silver clad copper alloys, it may be adapted for other materials and their composites, giving consideration to the purpose for which the present invention is intended.

Accordingly, it is an object of the present invention to improve the electrical conductivity of silver clad base metal composites without sacrificing their strength.

Another object of the present invention is to provide a silver clad base metal composite where the base metal has a relatively large grain size for improved formability.

Still another object of the present invention is to minimize base metal grain size of a silver clad base metal composite to insure uniformity of thickness of the silver coating.

Yet another object of the present invention is to facilitate low cost production of efficient, high conductivity silver clad base metal composites.

The present invention will now be further described by reference to the following drawings which are not intended to limit the accompanying claims.

BRIEF DESCRIPTION OF THE DRAWINGS

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Figure 1:
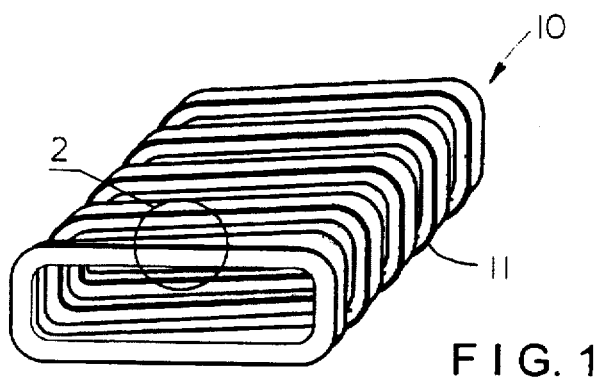
FIG. 1 is a perspective view of microwave tubing in accordance with one aspect of the present invention.

Microwave transmission requires tubular wave guides (or tubing) which have a relatively high conductivity material on the inside. In this connection, the present invention uses commercially pure silver for the inner skin of the tubing and at least one copper alloy in the outer layers. More particularly, Applicants have discovered that by using a relatively high conductivity interliner, e.g., a copper-zirconium alloy (C15100), between the inner skin and the outer layers, diffusion of impurities from the outer layers into the silver is eliminated, and a smooth, relatively constant cross section of the silver is maintained.

Generally speaking, the tubing comprises an interlocked, spiral wound copper alloy which acts as a mandrel or form around which to make the tubular wave guide. While an interliner layer of nickel would be a possible choice of one skilled in the art, nickel has been found unworkable. This problem inspired, at least in part, development of the present invention and its novel but unexpected results.

Referring now to the drawings and more particularly to FIGS. 1–5 there is shown a multilayer metal composite 10 for microwave tubing and the like, according to various aspects of the present invention.

Figure 2:
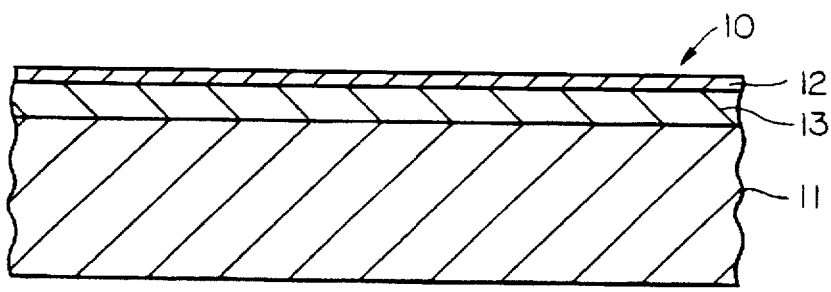
FIG. 2 is a sectional view of the tubing wall taken along line 2—2 of FIG. 1.

In one embodiment, as shown in FIGS. 1–2, the composite comprises a copper alloy base metal tube strip 11, e.g., brass (C26000) lined with silver 12. A relatively thin interliner alloy layer 13, e.g., 1/10 Mil, is provided between the base metal and the silver coating to limit diffusion of impurities from the base metal into the coating. More particularly, interliner layer 13 improves electrical conductivity of the silver while reducing interface roughness (or thickness variation) of the silver.

Another advantage of the interliner layer again is that it maintains a smooth, relatively constant cross section of silver. Where a silver coated brass base metal is provided, the interliner is preferably a copper-zirconium alloy. It is understood, however, that other relatively high conductivity alloys of copper may be used as interliners, within the spirit and scope of the present invention. Examples include tellurium-copper (C14530), cadmium-copper (C14300), manganese-copper (C15500), alumina-copper (C157XX), beryllium-copper (C17410), or the like.

Figure 3:
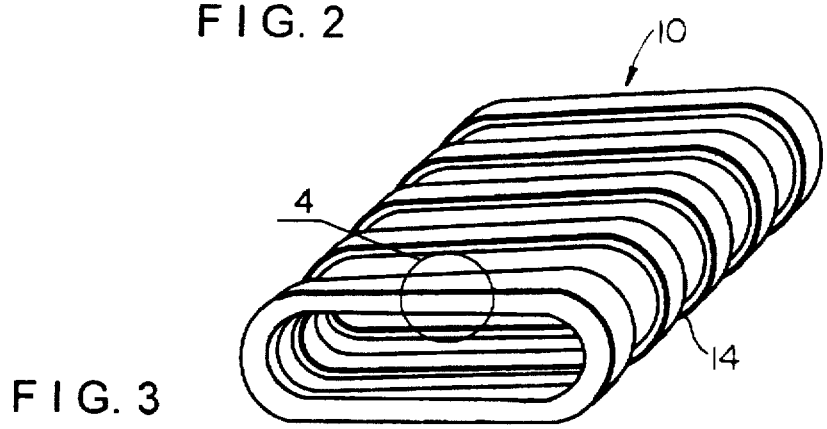
FIG. 3 is a perspective view of microwave tubing in accordance with another aspect of the present invention.
Figure 4:
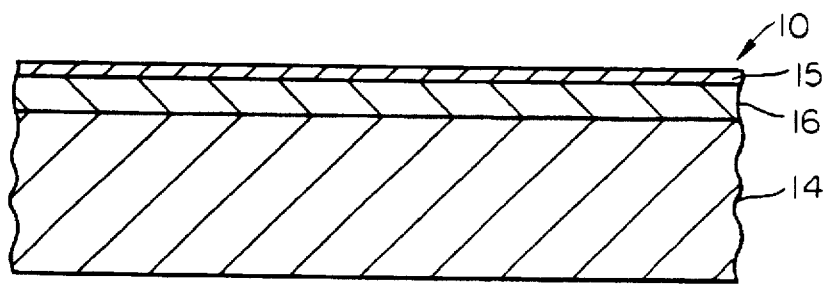
FIG. 4 is a sectional view of the tubing wall taken along line 4—4 of FIG. 3.
Figure 5:
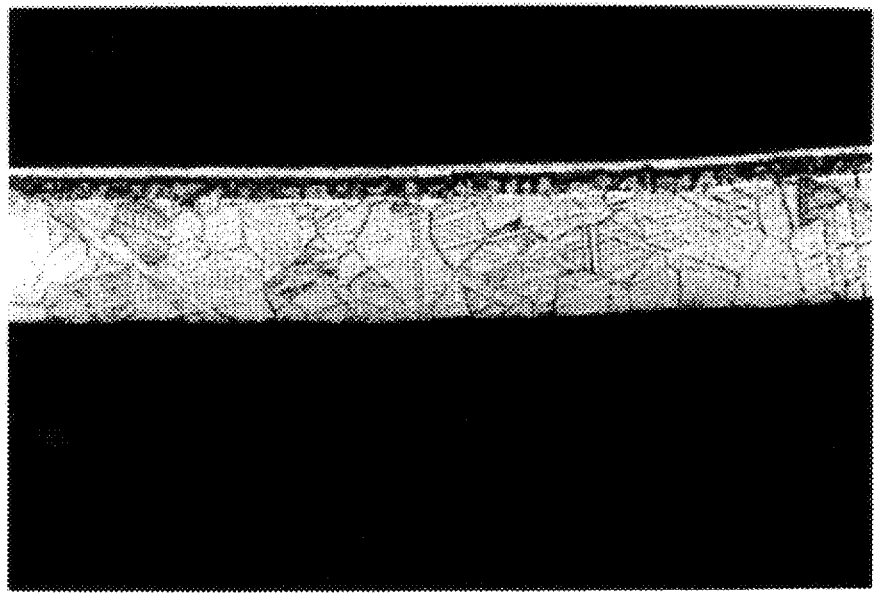
FIG. 5 is a micrograph of a multi-layer metal composite as set forth in FIG. 2 at 200×magnification.

According to another embodiment, set forth in FIGS. 3–4, composite 10 comprises a tubular shaped copper alloy base metal 14 such as phosphorus bronze (C51000) coated with a silver layer 15. Use of an interliner layer 16 of a copper-zirconium alloy between the base metal and the silver has been found suitable here as well. Again, an objective is to limit diffusion of impurities from the phosphorus bronze into the silver coating. Another objective is to maintain a smooth, relatively constant cross section of silver thickness, as demonstrated in FIG. 5.

The invention will now be further illustrated by the following examples, which are not intended to limit the scope of this disclosure.

EXAMPLE I

A composite of fine silver overlay on a brass (C26000) base metal with copper-zirconium alloy interliner layer was produced which measures about 0.0038 inch ± about 0.0002 inch by about 0.225 inch ± about 0.0010 inch. The silver overlay was about 0.000150–0.000180 inch thick, and the interliner layer measured about 0.00060–0.00072 inch thick.

In accordance with one aspect of the present invention, the brass initially measured about 0.050 inch. The fine silver was about 0.00275 inch thick, while the interliner layer was about 0.00825 inch thick. The brass and fine silver were initially cleaned by mechanical abrasion, e.g., brushing, and chemical solvents, then bonded using about 60–80% cold reduction. Next, edges of the sample were trimmed by slitting, then the sample was cold rolled to a final thickness of about 0.0038 inch ± about 0.0002 inch. After leveling and inspection, the sample was slit to about 0.225 inch ± about 0.001 inch and annealed in a strand furnace to recrystallize the grains of brass to the selected grain size and tensile properties.

The resulting mechanical properties tested were as follows: an ultimate tensile strength (UTS) of about 50 kpsi, a percent elongation generally within a range of 28% and 45%, and a grain size between about 0.030 mm and about 0.055 mm.

EXAMPLE II

A composite comprising a fine silver overlay on a phosphorus bronze (C51000) base metal with copper-zirconium alloy interliner layer was made which measures about 0.0038 inch ± about 0.0002 inch by about 0.2250 inch ± about 0.0010 inch; of which the fine silver overlay was about 0.000150–0.000180 inch thick and the interliner was about 0.00060–0.00072 inch thick.

Initially, according to one embodiment, the phosphorus bronze measured about 0.050 inch thick. The fine silver was about 0.0015 inch thick and the interliner layer measured about 0.0015 inch thick. The phosphorus bronze and fine silver were cleaned by mechanical abrasion, e.g., brushing, and chemical solvents, then bonded using about 60–80% cold reduction. Edges of the sample were trimmed by slitting. The sample was next cold rolled to a final thickness of about 0.0038 inch ± about 0.0002 inch. Following level flattening and inspection steps, the sample was slit to about 0.225 inch ± about 0.001 inch and annealed in a strand furnace to recrystallize grains of phosphorus bronze to the desired grain size and tensile properties.

The mechanical properties were an ultimate tensile strength (UTS) of about 49 kpsi, a percent elongation of about 25–45%, and a grain size generally within a range of 0.025 and 0.055 mm. The fine silver thickness was between about 0.000100 inch and about 0.000130 inch.

EXAMPLE III

A composite of fine silver overlay on a phosphorus bronze (C51000) base metal with copper-zirconium alloy interliner layer was made which measures about 0.0038 inch ± about 0.0002 inch by about 0.2250 inch ± about 0.0010 inch with a silver overlay of about 0.000100–0.000120 inch thick. The interliner layer was between about 0.0005 inch and about 0.0006 inch thick. Percent elongation was about 25–45% with a grain size generally within a range of 0.025 and 0.055 mm.

According to the present invention, the phosphorus bronze initially measured about 0.050 inch thick, the fine silver about 0.0053 inch thick, and the interliner layer about 0.0027 inch. Upon processing, the phosphorus bronze and fine silver were cleaned by mechanical abrasion, e.g., brushing, and chemical solvents, bonded using about 60–80% cold reduction, and edges of the sample trimmed by slitting. Next, the sample was cold rolled to a final thickness of about 0.0038 inch ± about 0.0002 inch. After leveling and inspection, the sample was slit to about 0.225 inch ± about 0.001 inch, then annealed in a strand furnace to recrystallize bronze grains to the target grain size and tensile properties.

An ultimate tensile strength (UTS) of about 50 kpsi, a percent elongation generally within a range of 28% and 35%, and a grain size between about 0.020 mm and about 0.050 mm were noted.

EXAMPLE IV

Further, a composite was produced which comprises a fine silver overlay on a phosphorus bronze (C51000) base metal with copper-zirconium alloy interliner layer, and measures about 0.0038 inch ± about 0.0002 inch by about 0.2250 inch ± 0.0010 inch. The fine silver overlay measured between about 0.000010 and about 0.000012 inch thick. The interliner layer was between about 0.0005 inch and about 0.0006 inch thick. Percent elongation was about 25–45%, and grain size was generally within a range of 0.025 and 0.040 mm.

In one embodiment of the present invention, the phosphorus bronze initially measured about 0.050 inch thick with fine silver about 0.0053 inch thick and the interliner layer about 0.0027 inch thick. The phosphorus bronze and silver were cleaned by mechanical abrasion, e.g., brushing, and chemical solvents, then bonded using about 60–80% cold reduction. Next, edges of the sample were trimmed by slitting. Thereafter, the sample was cold rolled to a final thickness of about 0.0038 inch ± about 0.0002 inch. Upon leveling and inspection, the sample was annealed in a strand furnace to recrystallize grains of phosphorus bronze to targeted mechanical properties, then slit to about 0.225 inch ± about 0.001 inch.

The resulting properties tested were: an ultimate tensile strength (UTS) of about 50 kpsi, a percent elongation between about 28% and about 35%, and a grain size generally within a range of 0.020 mm and 0.050 mm.

Although the present invention is shown and described in connection with composites of silver clad brass and silver clad bronze, it may be adapted for other materials and their composites, giving consideration to the purpose for which the present invention is intended.

By blocking diffusion of the base material's impurities from migrating into the silver, loss of electrical conductivity is avoided. The interliner also establishes a relatively smooth substrate layer to maintain a relatively constant cross-section of silver thickness, while maintaining a desired level of material performance. This reduces the overall silver content and, hence, product cost.

In addition, the use of phosphorus bronze permits slitting to be performed after the annealing step, which results in even lower production costs.

Various modifications and alterations to the present invention may be appreciated based on a review of this disclosure. These changes and additions are intended to be within the scope and spirit of this invention as defined by the following claims.

What is claimed is:

1. A tubular wave guide for microwave applications, comprising an interlocked, spiral wound, multilayer metal composite which includes a copper alloy base metal lined with silver and a relatively thin, grain refiner containing copper alloy interliner layer clad between the base metal and the silver, for limiting diffusion of impurities from the base metal into the silver coating and for maintaining relatively smooth surfaces and relatively constant thickness of the silver coating.

2. The composite set forth in claim 1 wherein the copper alloy is brass.

3. The composite set forth in claim 1 wherein the copper alloy is phosphorus bronze.

4. The composite set forth in claim 1 wherein the interliner layer is a copper alloy with a grain refiner added.

5. A tubular wave guide for microwave application, comprising an interlock, spiral wound, multilayer metal composite which includes a tubular shaped copper alloy base metal lined with silver and having a relatively thin interliner layer of a grain refiner containing copper alloy clad between the base metal and the silver, for limiting diffusion of impurities from the base metal into the silver coating and for maintaining relatively smooth surfaces and relatively constant thickness of the silver coating.

6. The composite set forth in claim 5 wherein the copper alloy is brass.

7. The composite set forth in claim 5 wherein the copper alloy is phosphorus bronze.

8. The composite set forth in claim 5 wherein the interliner layer is a copper-zirconium alloy.

9. A tubular wave guide for microwave application, comprising an interlocked, spiral wound, multilayer metal composite which includes a tubular shaped brass brass metal lined with silver and having a relatively tin interliner layer of a copper-zirconium alloy clad between the base metal and the silver, for limiting diffusion of impurities from the base metal into the silver lining and for maintaining relatively smooth surfaces and relatively constant thickens of the silver lining.

10. A tubular wave guide for microwave applications, comprising an interlocked, spiral wound, multilayer metal composite which includes a tubular shaped phosphorus bronze base metal lined with silver and having a relatively thin interliner layer of a copper-zirconium alloy clad between the base metal and the silver, for limiting diffusion of impurities from the base metal into the silver lining and for maintaining relatively smooth surfaces and relatively constant thickness of the silver lining.

* * * * *